United States Patent Office 3,268,581
Patented August 23, 1966

3,268,581
ANTHRAQUINONE DIALKANESULFONIMIDE
Joseph E. Dunbar, Midland, Mich., assignor to The Dow Chemical Company, Midland, Mich., a corporation of Delaware
No Drawing. Filed May 8, 1964, Ser. No. 366,150
5 Claims. (Cl. 260—556)

The present invention is directed to an anthraquinone dialkanesulfonimide compound corresponding to the formula

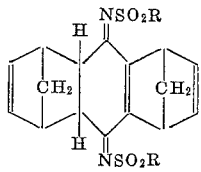

In the present specification and claims, R represents a branched or straight chain lower alkyl radical containing up to and including 4 carbon atoms such as methyl, propyl and isobutyl. The compounds of the present invention are crystalline solids which are soluble in many common organic solvents and of low solubility in water. They are useful as pesticides for the control of a number of pest organisms including insect, fungal and plant organisms such as blight, mites, radish millet and moneywort.

The products of the present invention can be prepared by reacting cyclopentadiene with a 5,8-dihydro-5,8-methano-1,4-naphthoquinone disulfonimide having the structure

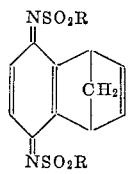

The reaction is conveniently carried out in the presence of an insert solvent such as carbon tetrachloride, benzene, toluene, xylene, methylene chloride, tetrachloroethane or chloroform. The concentration of reactants to be employed is not critical, some of the desired product being produced when the reactants are combined in any proportion. Best yields can be obtained by employing the cyclopentadiene and naphthoquinone disulfonimide reactants in equimolar amounts, and preferably when employing an excess of the cyclopentadiene reactant.

The reaction takes place at a temperature of from 0° to 110° C. and in a preferred range of from 0° to 50° C., over a short period of time with formation of the desired product. Upon completion of the reaction, the solid product can be collected by conventional procedure and employed in pesticidal applications or further purified by such common procedures as washing and recrystallization from a common organic solvent, before being so employed.

In carrying out the reaction, reactants can be combined together in any order. The cyclopentadiene and naphthoquinone disulfonimide can be combined and the reaction carried out. However, in a preferred procedure the cyclopentadiene is added to a dispersion of the naphthoquinone disulfonimide in the inert organic solvent. The reaction mixture is then maintained within the reaction temperature range for a short period of time to complete the reaction. The product is then isolated from the reaction mixture and employed in pesticidal applications or further purified by conventional procedures such as recrystallization before being so employed.

The following examples are merely illustrations and are not to be construed as limiting.

Example 1.—1,4,4a,5,8,9a-hexahydro-1,4:5,8-dimethano-9,10-anthraquinonedimethanesulfonimide

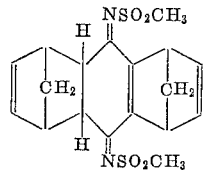

Cyclopentadiene (seven milliliters) was added with stirring, at room temperature, to a suspension of 5,8-dihydro-5,8-methano - 1,4 - naphthoquinonedimethanesulfonimide (12.0 grams; 0.0368 mole) in 300 milliliters of chloroform. The reaction mixture was maintained at room temperature for 10 minutes. The chloroform and excess cyclopentadiene were removed by evaporation in vacuo, leaving the product as a light yellow solid which was twice recrystallized from ethanol. The recrystallized 1,4,4a,5,8, 9a - hexahydro - 1,4:5,8 - dimethano - 9,10 - anthraquinonedimethanesulfonimide product melted with recomposition at about 182° C. The product had carbon, hydrogen and sulfur contents of 55.19 percent, 5.16 percent and 15.90 percent, respectively, as compared to the theoretical contents of 55.08 percent, 5.14 percent and 16.34 percent, respectively.

The following compounds of the present invention are prepared in a similar manner.

1,4,4a,5,8,9a - hexahydro - 1,4:5,8 - dimethano - 9,10-anthraquinonedibutanesulfonimide (molecular weight 506.5) by reacting together cyclopentadiene and 5,8-dihydro - 5,8 - methano - 1,4 - naphthoquinonedibutanesulfonimide.

1,4,4a,5,8,9a - hexahydro - 1,4:5,8 - dimethano - 9,10-anthraquinonediethanesulfonimide (molecular weight 460.5) by reacting together cyclopentadiene and 5,8-dihydro - 5,8 - methano - 1,4 - naphthoquinonediethanesulfonimide.

The new compounds of the present invention are useful as pesticides for the control of a number of pests such as various plant, fungal and insect organisms. For such uses the unmodified compounds can be employed. The products can also be dispersed on a finely divided solid and employed as a dust. Such mixtures can be dispersed in water with or without the aid of a surface active dispersing agent and the resulting aqueous dispersions employed as sprays, drenches, or washes. In other procedures, the products of the invention can be employed as toxic constituents in solvent solutions, water-in-oil and oil-in-water emulsions or aqueous dispersions. In representative operations, aqueous compositions containing 1,4, 4a,5,8,9a - hexahydro - 1,4:5,8 - dimethano - 9,10 - anthraquinonedimethanesulfonimide at concentrations of 300 parts per million gave substantially complete kills of tomato and potato late blight.

The 5,8-dihydro-5,8-methano-1,4-naphthoquinone disulfonimide starting materials such as: 5,8-dihydro-5,8-methano - 1,4 - naphthoquinonedipropanesulfonimide, 5, 8 - dihydro - 5,8 - methano - 1,4 - naphthoquinonediisobutanesulfonimide, employed in the present invention are prepared by known procedures. In such procedures, a 5,8 - dihydro - 5,8 - methano - 1,4 - naphthalenedisulfonamide corresponding to the formula

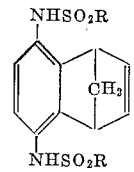

is oxidized by treatment with lead tetraacetate. The reaction takes place in the presence of glacial acetic acid or in the presence of an inert organic solvent, as reaction medium and at temperatures between 0 and 90° C. The crystalline solid naphthoquinone disulfonimide product is collected by conventional procedures. The 5,8-dihydro-5,8, - methano - 1,4 - naphthalene disulfonamide, employed above, can be prepared by reacting a p-quinonedisulfonimide, corresponding to the formula

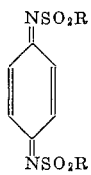

with cyclopentadiene in the presence of a tertiary amine. The reaction is conveniently carried out in an inert organic solvent as reaction solvent and between the temperatures of 0° and 110° C. The crystalline solid naphthalenesulfonamide is then collected by conventional procedures.

I claim:
1. The compound corresponding to the formula

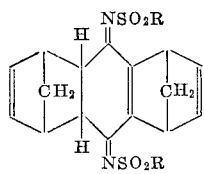

wherein R represents alkyl containing from 1 to 4 carbon aotms, inclusive.

2. 1,4,4a,5,8,9a - hexahydro - 1,4:5,8 - dimethano-9,10-anthraquinonedimethanesulfonimide.

3. 1,4,4a,5,8,9a - hexahydro - 1,4:5,8 - dimethano-9,10-anthraquinonediethanesulfonimide.

4. 1,4,4a,5,8,9a - hexahydro - 1,4:5,8 - dimethano-9,10-anthraquinonedipropanesulfonimide.

5. 1,4,4a,5,8,9a - hexahydro - 1,4,5,8 - dimethano-9,10-anthraquinonedibutanesulfonimide.

References Cited by the Examiner

Adams et al.: J. Am. Chem. Soc., vol. 73, pp. 1152–55 (1951).

WALTER A. MODANCE, *Primary Examiner.*
HARRY I. MOATZ, *Assistant Examiner.*